United States Patent
Anderson et al.

(10) Patent No.: US 9,184,979 B2
(45) Date of Patent: Nov. 10, 2015

(54) COMMUNICATION BETWEEN APPLICATION COMPONENTS DISTRIBUTED AMONG DEVICES

(71) Applicant: Amazon Technologies, Inc., Reno, NV (US)

(72) Inventors: David John Anderson, Seattle, WA (US); Inga Jugurt, Newcastle, WA (US); Charles Drummond Swan, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 273 days.

(21) Appl. No.: 13/750,342

(22) Filed: Jan. 25, 2013

(65) Prior Publication Data

US 2014/0214918 A1 Jul. 31, 2014

(51) Int. Cl.
*G06F 15/16* (2006.01)
*H04L 29/06* (2006.01)

(52) U.S. Cl.
CPC ................................ *H04L 29/06047* (2013.01)

(58) Field of Classification Search
CPC ................................................ H04L 29/06047
USPC ........................................................ 709/203
See application file for complete search history.

(56) References Cited

U.S. PATENT DOCUMENTS

| | | | |
|---|---|---|---|
| 5,881,268 A | 3/1999 | McDonald et al. | |
| 7,430,610 B2 * | 9/2008 | Pace et al. | 709/233 |
| 7,574,601 B2 * | 8/2009 | Jahromi et al. | 713/168 |
| 7,603,716 B2 * | 10/2009 | Frank et al. | 726/25 |
| 2003/0018694 A1 | 1/2003 | Chen et al. | |
| 2008/0148231 A1 * | 6/2008 | Weber | 717/120 |
| 2010/0150120 A1 * | 6/2010 | Schlicht et al. | 370/338 |

OTHER PUBLICATIONS

International Search Report dated Jun. 17, 2014 in corresponding International Application No. PCT/US14/12796 filed Jan. 23, 2014.

* cited by examiner

*Primary Examiner* — Moustafa M Meky
*Assistant Examiner* — Sm Z Islam
(74) *Attorney, Agent, or Firm* — Thomas Horstemeyer, LLP

(57) ABSTRACT

Disclosed are various embodiments for facilitating communications between application components that are distributed among many devices across a network. This allows for the application to execute as if on one device even though the application components are on many devices. A component interface is generated for the application components. The component interface intercepts communications sent from an application component, locates the intended receiving application component, and generates a component interface packet with the location. The component interface packet is then put into a network stream. The receiving component listens to the stream to obtain component interface packets that indicate the location of the device running the receiving application component. The component interface decodes the component interface packets intended for components associated with the component interface and sends communications encoded in the packet to the application components.

20 Claims, 6 Drawing Sheets

COMMUNICATION BETWEEN APPLICATION COMPONENTS DISTRIBUTED AMONG DEVICES

CROSS-REFERENCE TO RELATED APPLICATION

This application is related to U.S. patent application Ser. No. 13/750,218, filed on even date herewith, entitled "Distribution of Application Components among Devices," now abandoned, and co-pending PCT Application No. PCT/US14/12796, filed Jan. 23, 2014, entitled "Distribution of Application Components among Devices."

BACKGROUND

Applications are executed on devices. Applications may use significant resources during execution. Resources may be more optimally managed by distributing an application among many devices. Distributing applications among many devices may require developing a version of the application for each of the devices to facilitate executing parts of the application on different devices. Furthermore, it may be difficult to divide the application into components and execute the components as if all are on the same device.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

Applications are executed on devices. For example, a game may be played on a personal computer. Such an application may comprise many application components. For instance, the game may have input components, graphic components, ranking components, score components, and many other components that facilitate execution of the game on the computer. According to various embodiments, these application components are distributed among many devices for execution to more optimally execute the application. For example, the input components may be executed on the computer, but the other components may be distributed across a network to a computing environment comprising many devices, such as servers, for executing the application components on one or more of those devices.

To optimally execute an application in devices, a system may determine an optimal distribution of the application components among a plurality of computing devices based on certain metrics. For example, the system may distribute an application component to a device that executes the application component using the least amount of memory or the least processor execution time. In spite of the distribution of application components for execution, the application components will still need to communicate with each other as if they are all executed on the same device. To facilitate this, the system may wrap components with a component interface. For example, the system may have a communication layer to intercept messages from components and then route the messages across the network to the device executing the application components intended to receive the messages.

During execution, the system may redistribute the application components if a performance metric violates a performance tolerance. For instance, the system may distribute a component to another device if the first device has too little available computing resources. The performance tolerances may be predefined or defined based on the performance metrics collected before or during execution. In various embodiments, the system may create a component distribution profile to reflect the distribution among certain devices, to facilitate an initial distribution, and to facilitate redistribution during execution.

In the following discussion, a general description of the system and its components is provided, followed by a discussion of the operation of the same.

Figure 1:
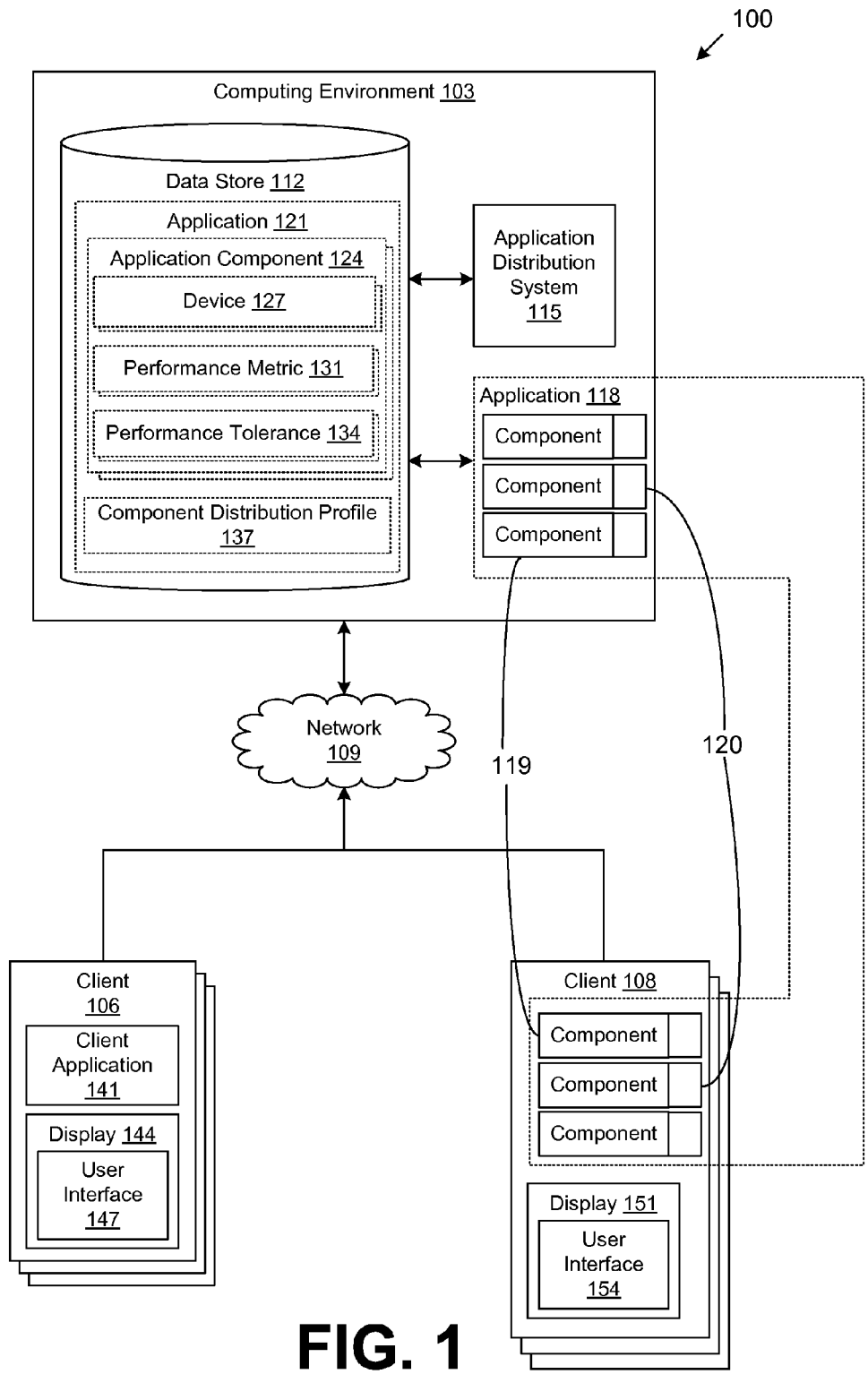
FIG. 1 is a drawing of a networked environment according to various embodiments of the present disclosure.

With reference to FIG. 1, shown is a networked environment 100 according to various embodiments. The networked environment 100 includes a computing environment 103, and a client device 106, which are in data communication with each other via a network 109. The network 109 includes, for example, the Internet, intranets, extranets, wide area networks (WANs), local area networks (LANs), wired networks, wireless networks, or other suitable networks, etc., or any combination of two or more such networks.

The computing environment 103 may comprise, for example, a server computer or any other system providing computing capability. Alternatively, the computing environment 103 may employ a plurality of computing devices that may be employed that are arranged, for example, in one or more server banks or computer banks or other arrangements. Such computing devices may be located in a single installation or may be distributed among many different geographical locations. For example, the computing environment 103 may include a plurality of computing devices that together may comprise a cloud computing resource, a grid computing resource, and/or any other distributed computing arrangement. In some cases, the computing environment 103 may correspond to an elastic computing resource where the allotted capacity of processing, network, storage, or other computing-related resources may vary over time.

Various applications and/or other functionality may be executed in the computing environment 103 according to various embodiments. Also, various data is stored in a data store 112 that is accessible to the computing environment 103. The data store 112 may be representative of a plurality of data stores 112 as can be appreciated. The data stored in the data store 112, for example, is associated with the operation of the various applications and/or functional entities described below.

The components executed on the computing environment 103, for example, include the application distribution system 115, application 118, and other applications, services, processes, systems, engines, or functionality not discussed in detail herein. The application distribution system 115 is executed to distribute application components 119 among devices across a network and to facilitate communication between the application components 119 as if they are all executing on the same device. Embodiments of the application distribution system 115 may be executed to redistribute the application components 119 based on certain performance metrics that indicate another distribution may be preferred. In redistributing the application components 119, the application distribution system 115 may need to capture the state of execution of the application components prior to redistribution and then update the components with the state of execution upon redistributing them among devices.

Various embodiments of the application distribution system 115 may facilitate communication across a network between the application components 119 distributed on various computing devices without modifying the components themselves with the location of other components. Thus, the application components 119 may continue to communicate as if being executed on one device. Communication may be structured by component interfaces 120 wrapped around the components. The component interface 120 intercepts communication calls or other messages from application components 119. Once intercepted, the component interface 120 includes the messages in component interface packets that may be retrieved and decoded by application components 119 from a network stream regardless of which device is currently executing the application components 119.

An application 118 is executed in the computing environment 103 and/or the client 108 by the application distribution system 115 distributing components 119 between the computing devices. An application component 119 may be any division of an application. For example, an application component may be a data structure in a library, a method, an object, a function, an externally identified division of the application, or any other part of an application. The application components 119 may be simultaneously executed on many devices, distributed to one device, or any combination thereof. For example, in a photo editor application 118, user input application components 119 may be executed on the client 108 while processor-intense application components 119 may be executed on devices in the computing environment 103. In various embodiments, the application distribution system 115 may distribute the same processor-intense application component 119 to many devices for execution to ensure the fastest available device executes the application component 119.

The data stored in the data store 112 includes, for example, applications 121, and potentially other data. Applications 121 may include data related to applications executed on devices. For example, application 121 data may include data related to application components 124. Application component 124 may include data related to its execution. For example, a device 127 may have been preidentified as capable of executing the application component. A device 127 may be a server computer or any other system providing computing ability.

Another example of data related to an application component 124 is performance metrics 131. Performance metrics 131 include any data related to executing application components 124. Performance metrics may include, for example, an elapsed time of execution for the application component, a computing device metric, such as an availability of computing operations in the device executing the application component 119, a processor execution time clocked while executing the application component 119, a memory usage while executing the application component 119, number of component operations consumed when executing the application component, or any other data relevant to measuring the performance of a computing device or the execution of the application component 119.

An additional example of data related to an application component 124 is performance tolerances 134. Performance tolerances 134 may be predefined and stored in the data store 112 or they may be heuristically determined based on execution of the application component 124. Performance tolerances may be, for example, a maximum elapsed time of execution for the application component, a minimum availability of computing operations for the device executing the application component 119, a maximum processor execution time clocked while executing the application component 119, a minimum memory usage while executing the application component 119, or any other data relevant to evaluating the performance of a computing device or the application component 119. As illustrated by the examples of performance tolerances 134 and examples of performance metrics 131, the application distribution system 115 may compare the performance tolerances 134 to respective performance metrics 131 for the application distribution system 115 to know when to redistribute the application components 119 among devices, as will be explained in more detail during discussion of FIG. 3A below.

Application 121 data may also include a component distribution profile 137. The component distribution profile 136 may include any data related to the distribution of application components 119 among devices. For example, the component distribution profile 136 may include data related to when the application distribution system 115 redistributes the application components 124 to other respective devices 127. Additional examples involve component distribution profile 137 data concerning an initial or default distribution of the application components 124. This initial distribution may have been predetermined, for example, based on performance metrics 131 or some other indication of how to initially distribute application components 124 obtained from past execution of the application 118.

The client 106 is representative of a plurality of client devices that may be coupled to the network 109. The client 106 may comprise, for example, a processor-based system such as a computer system. Such a computer system may be embodied in the form of a desktop computer, a laptop computer, personal digital assistants, cellular telephones, smartphones, set-top boxes, music players, web pads, tablet computer systems, game consoles, electronic book readers, or other devices with like capability. The client 106 may include a display 144. The display 144 may comprise, for example, one or more devices such as liquid crystal display (LCD) displays, gas plasma-based flat panel displays, organic light emitting diode (OLED) displays, LCD projectors, or other types of display devices, etc.

The client 106 may be configured to execute various applications such as a client application 141 and/or other applications. The client application 141 may be executed in a client 106, for example, to access network content served up by the computing environment 103 and/or other servers, thereby rendering a user interface 147 on the display 144. To this end, the client application 141 may comprise, for example, a browser, a dedicated application, etc., and the user interface 147 may comprise a network page, an application screen, etc. The client 106 may be configured to execute applications beyond the client application 141 such as, for example, email applications, social networking applications, word processors, spreadsheets, and/or other applications.

The client 108 is representative of a plurality of client devices that may be coupled to the network 109. The client 108 may comprise, for example, a processor-based system such as a computer system. Such a computer system may be embodied in the form of a desktop computer, a laptop computer, personal digital assistants, cellular telephones, smartphones, set-top boxes, music players, web pads, tablet computer systems, game consoles, electronic book readers, or other devices with like capability. The client 108 may include a display 151. The display 144 may comprise, for example, one or more devices such as liquid crystal display (LCD) displays, gas plasma-based flat panel displays, organic light emitting diode (OLED) displays, LCD projectors, or other types of display devices, etc.

The client 108 may be configured to execute application components 119 of application 118 as the components are distributed to the client 108 by the application distribution system 115. The client application 118 may be executed in a client 108, for example, to access network content served up by the computing environment 103 and/or other servers, thereby rendering a user interface 154 on the display 151. To this end, the client application 118 may comprise, for example, a browser, a dedicated application, etc., and the user interface 154 may comprise a network page, an application screen, etc. The client 108 may be configured to execute applications beyond the client application 118 such as, for example, email applications, social networking applications, word processors, spreadsheets, and/or other applications.

Next, a general description of the operation of the various components of the networked environment 100 is provided. To begin, the application distribution system 115 may obtain an application 118 for execution. As the application 118 is developed, a user at a client 106 may identify application components 119 of the application 118 and devices capable of executing application components 119 through a user interface 147 for an application development client application 141. The application distribution system 115 may then obtain these external identifications of the application components 119 across the network 109. In various embodiments, the application distribution system 115 may also/instead identify application components 119 based on a data structure in a library, a method, an object, a function, or any other logical division an application. The application distribution system 115 may store information about the application 118 and application components 119 in the data store 112 as application 121 data and application component 124 data.

The application distribution system 115 may determine a distribution of the application components 119 across the computing environment 103 and/or client 108 based on performance metrics 131, the components distribution profile 137, or other indicators of the optimal distribution of components. The optimal distribution may be the most efficient use of computing resources, an externally identified optimal distribution, or other preferred distribution that meets performance tolerances 134. The same component 119 may be distributed to multiple devices or to one device. In various embodiments, the application distribution system 115 may run in the computing environment 103, the client 108, or both, depending on the needs of the system.

Once the component distribution has been determined, the application distribution system 115 wraps the components 119 with component interfaces 120. The components 119 may be wrapped individually or in groups of components 119. The application distribution system 115 distributes the components 115 to their respective client 108 devices and/or devices in the computing environment 103. The component interface 120 facilitates operation of the components 119 as if the application were being executed on a single device without modifying the components 119 themselves by intercepting and routing communications between the components 119.

A component 119 attempts to communicate by, for example, calling another component 119. Because the other component 119 may have been distributed to another device and the caller component 119 was not modified to call the component on the new device, the component interface 120 intercepts the communication. The component interface 120 creates an interface packet that may be routed to the component by sending the packet across the network 109 to the location of the device executing the other component. The interface packet may include, among other information, the location of the device executing the other component and the communication sent from the caller component 119. The application distribution system 115 includes the location of devices executing other components 120 in the component interface 120. The location may be, for example, the network address of the device executing the component 119 or any other identifier that facilitates the component interface 120 communicating across a network 109 with other components 119. The application distribution system 115 updates the component interfaces 120 with new locations when the components 119 are redistributed.

The component interfaces 120 further facilitate communication by listening to network traffic to identify interface packets containing the location of the device on which the component interface 120 resides. Once an interface packet with the respective device's location is detected, the component interface 120 extracts the communication from the packet and sends it to the proper component 119.

As the components 119 are executed in their respective devices, the application distribution system 115 collects performance metrics 131. Based on a comparison of the performance metrics 131 to performance tolerances 134, the application distribution system 115 may redistribute the components 119. To do so, it must first obtain a current state of execution of the component 119. It then updates the component interfaces 120 based on the new devices appointed to execute the components so that the component interface 120 may identify the device executing the component 119 intended to receive the communication. After distributing the components 119, the application distribution system 115 will notify the components 119 of the current state of execution so that execution of the components 119 may continue despite the redistribution of the components 119. During execution, the component interfaces 120 intercept messages to facilitate sending the message to the correct device associated with the component 119. The component interfaces 120 also monitor network traffic to obtain messages intended for the device on which the component interface 120 is located.

As a non-limiting example, the application distribution system 115 may obtain an application 118 executed to edit pictures on a cell phone client 108. The application 118 may have many features, such as tagging the picture, adjusting the brightness of the picture, and sharpening the picture. Each of these features may comprise many functions to facilitate the features. For example, the tag feature has an input box function, a store tag function, and possibly other functions required to allow the user to tag the picture with keywords. The brightness feature may have an input bar function for the user to input the brightness level change, a color analyzer function that identifies the red, blue, and green channel values, a color modifier function that adjusts those values, and a display function that displays the adjusted photograph to the user. The application distribution system 115 may identify each of these functions as an application component 119 or it may identify even smaller functions as components 119.

Continuing the non-limiting example, to determine an initial distribution of the components 119 among the client 108 and devices in the computing environment 103, the application distribution system 115 may identify that the brightness change input component 119 and the display component 119 must occur on the client 108 device, so it will distribute those application components 119 to the client 108 for execution. But the other application components 119 may be run on either the client device 108 or in the computing environment 103. The application distribution system 115 may run these components on both the client and the computing environment 103 to obtain initial performance metrics 131. Alternatively, the application distribution system 115 may already have performance metrics 131 and/or a component distribution profile 137 to facilitate determining a distribution of the components 119. The application distribution system 115 may distribute the application components 119 to the device that indicates the lowest processor execution time, for example. This may be the devices located in the computing environment 103, so the application distribution system 115 will distribute the color modifier component and color analyzer component 119 to the computing environment 103 for execution. One metric for determining distribution may be network latency. The application distribution system 119 may distribute components 119 needing immediate resources on the client 108 to the client 108 because the network latency renders distributing components 119 to the computing environment 103 less than optimal.

To facilitate communication between the input components 119 being executed in the client 108 and the components 119 being executed in the computing environment 103, the application distribution system 115 will wrap the application components 119 being executed in the client 108 with a component interface 120 that has the network address of the device or devices in the computing environment 103 executing the other application components 119. In various embodiments, each application component 119 may have its own component interface 120 with the network address of the device executing all other application components 119 or some other combination of application components 119 may be wrapped with a component interface 120.

Continuing the non-limiting example, when the user slides the brightness input application component 119, the component interface 120 associated with that component 119 will intercept the message sent to the color analyzer application component 119 because that message was sent without knowledge that the color analyzer application component 119 is not being executed on the client 108. The application distribution system 115 is aware of this, so it generates a component interface packet with the network address of the device executing the color analyzer component 119 and the communication sent by the input component 119. The application distribution system 115 places the component interface packet into a network stream on the network 109. The component interface 120 of the color analyzer application component 119 listens to the network stream and obtains the packet because it has a network address that matches its device. The component interface 120 may then extract the message sent by the brightness input application component 119 and send it to the color analyzer application component 119. Similarly, when the color modifier application component 119 sends the modification for the picture to the display application component 119, the respective component interfaces 120 will intercept the messages, generate component interface packets, and extract the message from the component interface packets.

Figure 2:
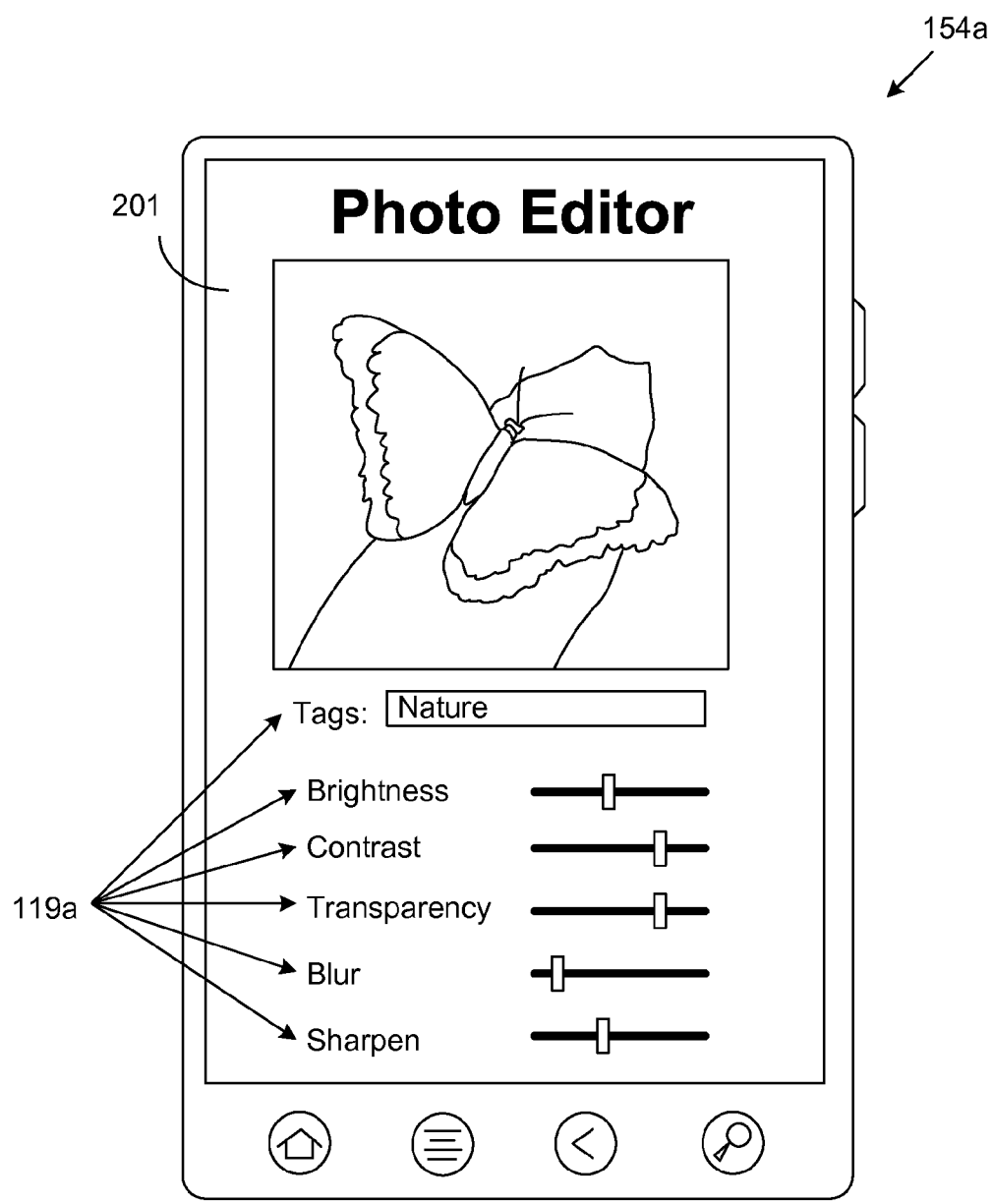
FIG. 2 is a drawing of an example of a user interface rendered by a client in the networked environment of FIG. 1 according to various embodiments of the present disclosure.

Referring next to FIG. 2, shown is one example of a user interface 154 (FIG. 1), denoted herein as 154*a*, rendered by a client application 188*b* (FIG. 1), executed in a client 108 (FIG. 1) in the networked environment 100 (FIG. 1). The user interface 154*a* includes a network photo editor page 201 that depicts a picture and functions available for modifying that picture. The functions for modifying the picture may each be at least one application component 119 (FIG. 1), denoted herein as 119*a*. In various embodiments, the application distribution system 115 may further divide these functions into smaller functions for identifying application components 119 or an external identification may have indicated what division of the photo editor application should be made to identify its application components 119. The application components 119*a* may be wholly or in part executed on the client 108 and/or in the computing environment 103 (FIG. 1).

Figure 3A:
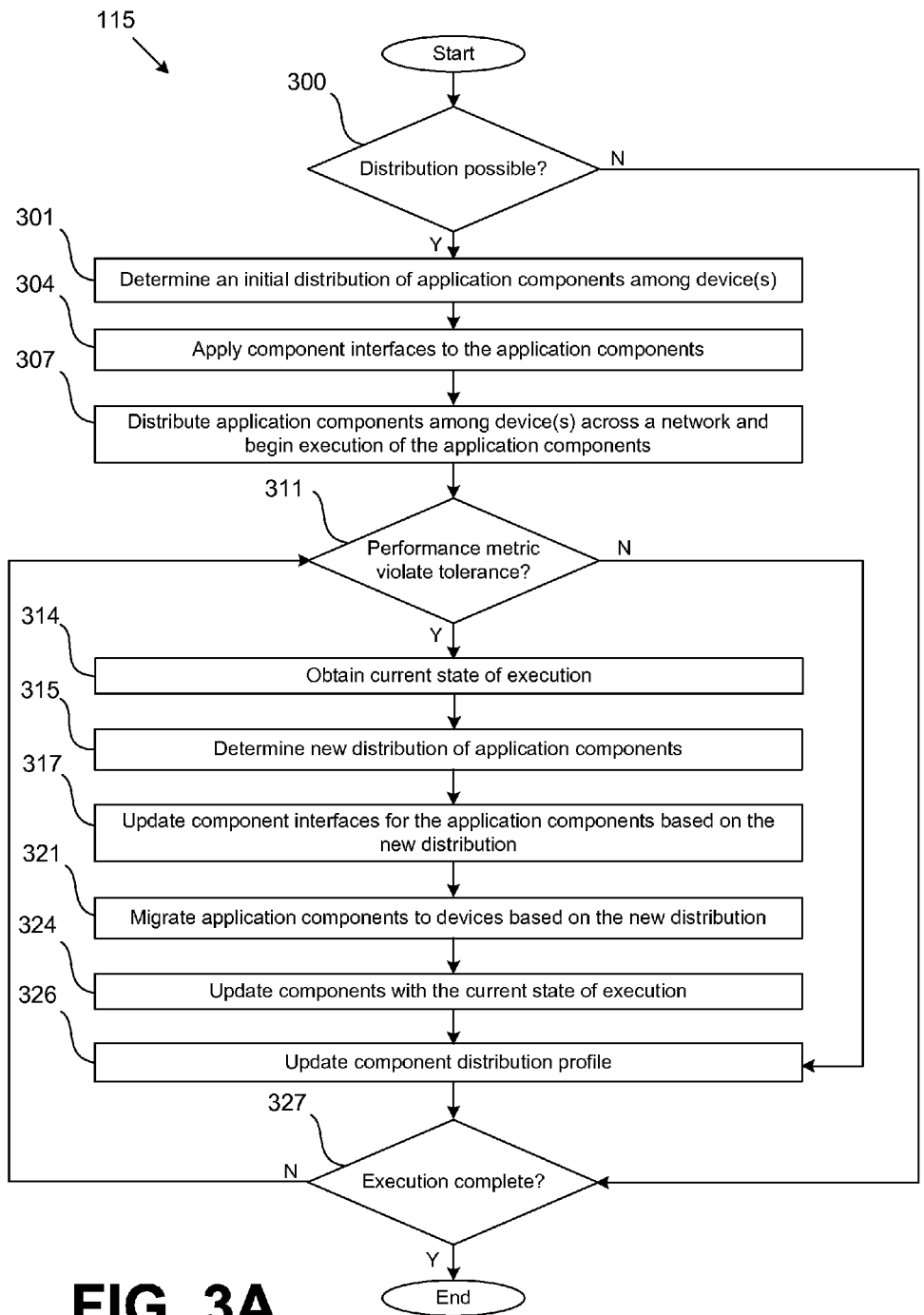
FIGS. 3A-3C are flowcharts illustrating examples of functionality implemented as portions of a component system and a component wrapper system executed in a computing environment in the networked environment of FIG. 1 according to various embodiments of the present disclosure.

Referring next to FIG. 3A, shown is a flowchart that provides one example of the operation of a portion of the application distribution system 115 according to various embodiments. It is understood that the flowchart of FIG. 3A provides merely an example of the many different types of functional arrangements that may be employed to implement the operation of the portion of the application distribution system 115 as described herein. As an alternative, the flowchart of FIG. 3A may be viewed as depicting an example of steps of a method implemented in the computing environment 103 (FIG. 1) according to one or more embodiments.

Beginning with box 300, the application distribution system 115 evaluates whether distribution of application components 124 (FIG. 1) among devices is possible. In various embodiments, the application distribution 115 may determine whether distribution of a component 124 to another device is possible based on external identification in a client 106 (FIG. 1) during application development, a predefined device 127 (FIG. 1) required for execution, or other indication of whether the components 119 may operate on multiple devices or whether the components 119 must execute on a single device. For example, a display component 119 comprising a user interface may be required on a display 151 (FIG. 1) of the client 108 (FIG. 1), but a generation component 119 that generates a part of that user interface may be done in either the client 108 or the computing environment 103.

Moving to box 301, the application distribution system 115 determines an initial distribution of application components 124 (FIG. 1) among devices 127 (FIG. 1). In various embodiments, the application distribution system 115 may distribute all of the application components 124 on multiple devices. This may, for example, facilitate obtaining performance metrics 131 (FIG. 1). Alternatively, the application distribution system 115 may distribute the application components 124 to different devices 127. In various embodiments, the application distribution system 115 may determine the distribution based on a component distribution profile 137 (FIG. 1) stored in the data store 112 (FIG. 1). For example, the component distribution profile 137 may identify certain devices 127 associated with certain application components 124 previously identified as an optimal distribution. In various embodiments, the application distribution system 115 may also or instead distribute the application components 124 based on performance metrics 131 (FIG. 1) stored in the data store 112. For example, each application component 119 (FIG. 1) may be associated with a device based on a performance metric 131 within a predefined performance tolerance 134.

Continuing with box 301, application components 119 may represent any division of an application 118. For example, an application component 119 may be a data structure in a library, a subroutine, an object, a function, or some other division of an application 118. In various embodiments, application components 119 may be identified externally through a user interface 147 (FIG. 1) on a client 106.

In box 304, the application distribution system 115 applies component interfaces 120 to the application components 119 to facilitate communications. These may be applied to each application component 119 or to groups of application components 124. For example, the component interface 120 may be applied to all application components 119 on a device, or to some other group. The component interface 120 will be discussed more in connection with FIGS. 3B and 3C.

In box 307, the application distribution system 115 distributes the application components 119 among devices across a network and begins execution of the application components 119. The application distribution system 115 distributes a component by sending the component 119 and its interface 120 to a respective device for execution.

In box 311, the application distribution system 115 evaluates whether a collected performance metric 131 (FIG. 1) has violated a performance tolerance 134 (FIG. 1). If the performance metric 131 does not violate a respective performance tolerance 134, then the application distribution system 115 continues to box 326. A performance tolerance 134 sets either a maximum or a minimum value for a respective performance metric 131. The performance tolerances 134 may be predefined and/or set by the application distribution system 115 based on current operating conditions. On example of a performance metric 131 may be an elapsed time of execution. The elapsed time of execution may be defined as the time spent executing the application component 119. The respective performance tolerance 134 may set a maximum elapsed time of execution above which the tolerance would be violated since above the maximum would not be an optimal distribution. The maximum elapsed time of execution may be a value above the elapsed time of execution previously recorded in another device or some other definition that indicates another device may be more optimal.

Continuing with box 311, another example of a performance metric 131 may be an availability of computing resources. The respective performance tolerance 131 may be a minimum availability of computing resources below which the tolerance would be violates since there may not be sufficient computing resources on that device to execute the application component 119. Thus, the application distribution system 115 may distribute the application component 119 to another device that has more computing resources available.

Continuing with box 311, an example of a performance metric 131 may be the processor execution time. The respective performance tolerance 131 may be a maximum processor execution time used by the application component 119 above which the application distribution system 115 may distribute the component to another device. The maximum processor execution time may have been defined based on a lower processor execution time in another device or some other indication the processor execution time would be more optimal in another device.

Continuing with box 311, an example of a performance metric 131 may be the memory usage of the application component 119 in the device. The respective performance tolerance 131 may be a maximum memory usage above which the application distribution system 115 may distribute the component to another device. The maximum memory usage may have been defined based on a lower memory usage by the application component 119 in another device or some other indication that the memory usage would be more optimal in another device.

In box 314, the application distribution system 115 obtains the current state of execution. This facilitates, for example, capturing the point in application prior to redistributing the application components 119 since once an application component is sent to a new device for execution, it will need to be able to continue execution as if it had not been redistributed.

In box 315, the application distribution system 115 determines a new distribution of the application components 119. This may be done similarly to determining an initial distribution in box 301. In various embodiments, the application distribution system 115 may determine the distribution based on a component distribution profile 137 (FIG. 1) stored in the data store 112 (FIG. 1). For example, the component distribution profile 137 may identify certain devices 127 associated with certain application components 124 previously identified as an optimal distribution. In various embodiments, the application distribution system 115 may also or instead distribute the application components 119 based on performance metrics 131 (FIG. 1) stored in the data store 112. For example, each application component 119 may be associated with a device 127 based on a performance metric 131 within a pre-defined performance tolerance 134. Network latency may also be taken into account when distributing application components 119.

In box 317, the application distribution system 115 updates the component interfaces for the application components 119 with the network addresses of the new devices executing the application components 119.

In box 321, the application distribution system 115 migrates the application components 115 to the devices identified in determining the new distribution in box 315. In box 324, the application distribution system 115 updates the components with the current state of execution so that the application 118 may continue to operate as if no distribution had occurred.

In box 326, the application distribution system 115 updates the component distribution profile 137 with the new performance metrics 131 collected in box 311 and other data useful for determining a distribution of application components 119.

In box 327, the application distribution system 115 evaluates whether execution is complete. If it is not, it returns to box 311. If it is, this portion of application distribution system 115 ends.

Figure 3B:
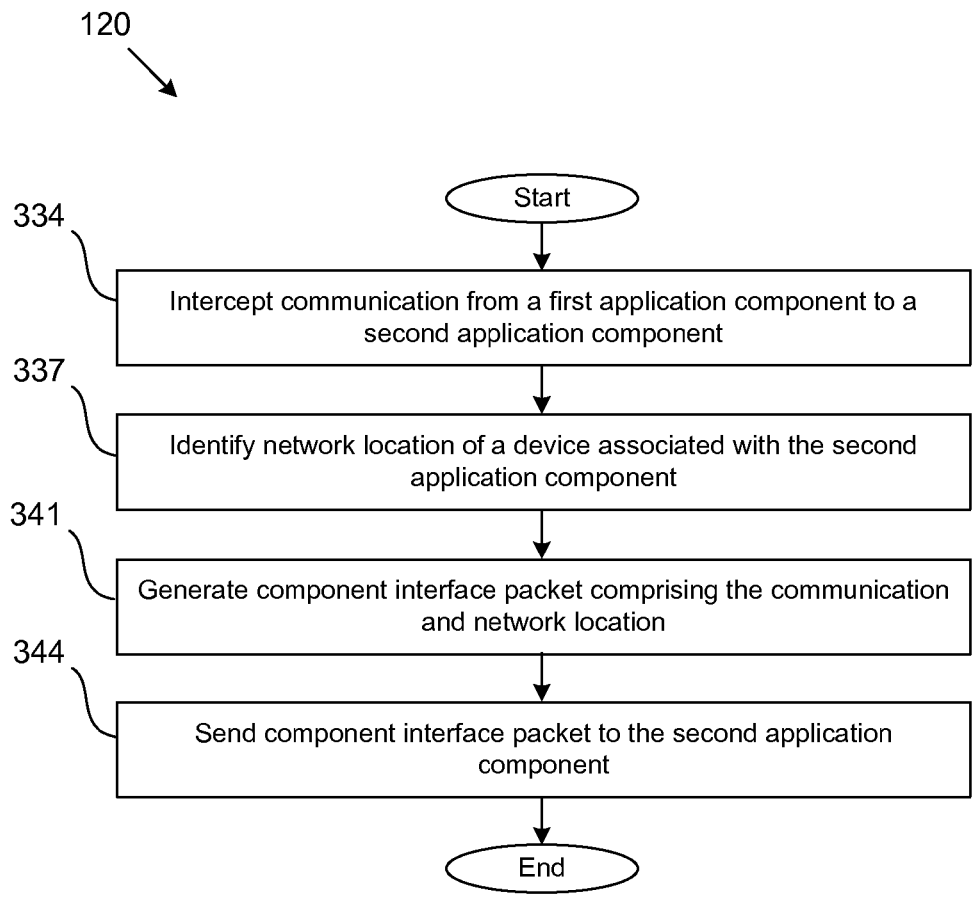

Referring next to FIG. 3B, shown is a flowchart that provides one example of the operation of a portion of the component interface 120 according to various embodiments. It is understood that the flowchart of FIG. 3B provides merely an example of the many different types of functional arrangements that may be employed to implement the operation of the portion of the component interface 120 as described herein. As an alternative, the flowchart of FIG. 3B may be viewed as depicting an example of steps of a method implemented in the computing environment 103 (FIG. 1) according to one or more embodiments.

Beginning with box 334, the component interface 120 intercepts a communication from a first application component 119 (FIG. 1) intended for a second application component 119. The communication may be, for example, a message, a request for an output, or other interface with another application component 119.

In box 337, the component interface 120 identifies a network location of a device associated with the application component 119. There may be many devices currently executing the application component 119. In this instance, component interface 120 may identify the location of a device executing the application component 119 that has the best performance metric 131 and/or it may identify many of the devices executing the application component 119. The network location may be, for example, a network address, an internet protocol address, a base address, a media access control address, and/or other location that identifies how to send a communication to a device across a network.

In box 341, the component interface 120 generates a component interface packet comprising the communication and network location. The component interface packet may have any structure that facilitates communication between the application components 119 even if the application components 119 are not being executed on the same device. The component interface packet may, for example, have a header with the network location of the second application component 119 and a payload that has the communication sent from the first application component 119.

In box 344, the component interface 120 sends the component interface packet to the second application component 119. This is done by putting the interface packet into a network stream if the application components are not being executed on the same device or it sends the component interface packet to the component on the same device if the same device is being used. Thereafter, this portion of the component interface 120 ends.

Figure 3C:
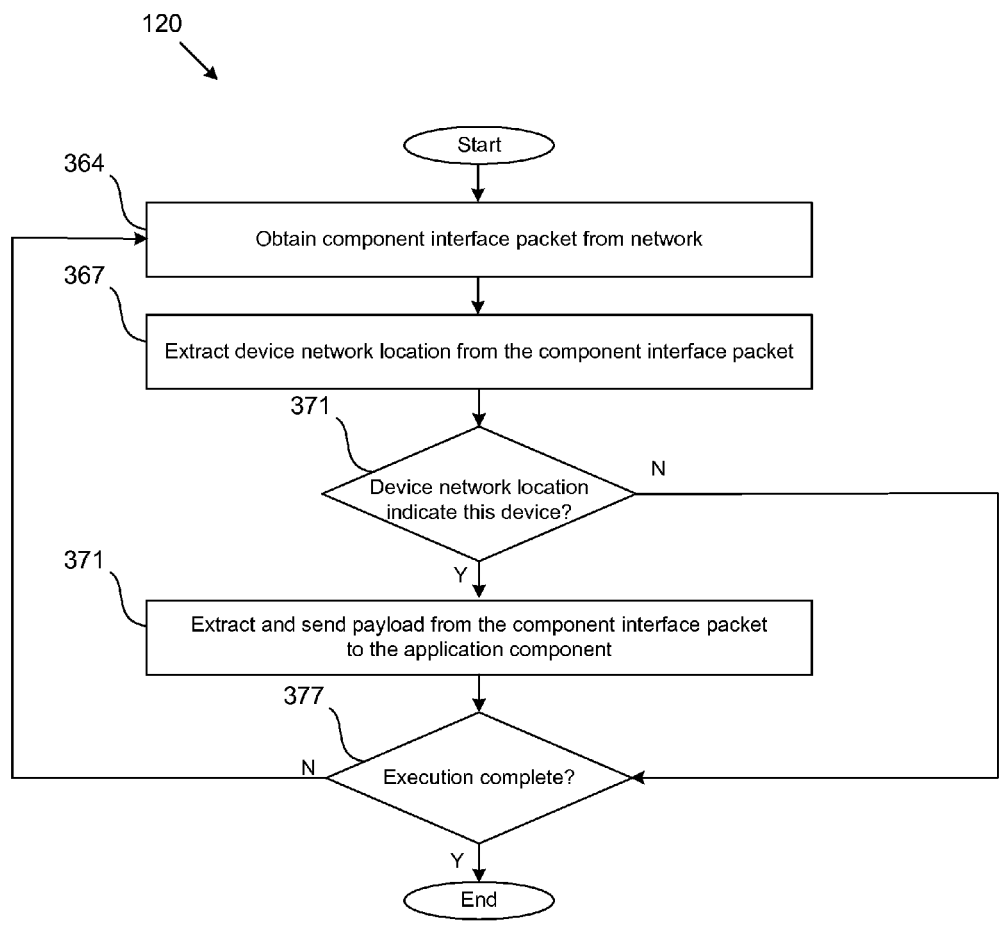

Referring now to FIG. 3C, shown is a flowchart that provides one example of the operation of a portion of the component interface 120 according to various embodiments. It is understood that the flowchart of FIG. 3C provides merely an example of the many different types of functional arrangements that may be employed to implement the operation of the portion of the component interface 120 as described herein. As an alternative, the flowchart of FIG. 3C may be viewed as depicting an example of steps of a method implemented in the computing environment 103 (FIG. 1) according to one or more embodiments.

Beginning with box 364, the component interface 120 obtains a component interface packet from the network 109 (FIG. 1). In box 367, the component interface 120 extracts the device network location from the component interface packet. In box 371, the component interface 120 evaluates whether the network location indicates that the component interface packet was intended for this device. This may be done, for example, by comparing the network location to a location associated with the device. For instance, if the network location is an internet protocol address, the component interface 120 will compare it to the internet protocol address of the respective device. If the network location does not match, then the component interface 120 continues to box 377.

In box 371, the component interface 120 extracts the payload from the component interface packet and sends it to the application component 119. The payload may be, for example, a communication from another application component 119.

In box 377, the component interface 120 evaluates whether execution is complete. If it is not, the application distribution system 115 returns to box 364. If it is complete, thereafter this portion of the component interface 120 ends.

Figure 4:
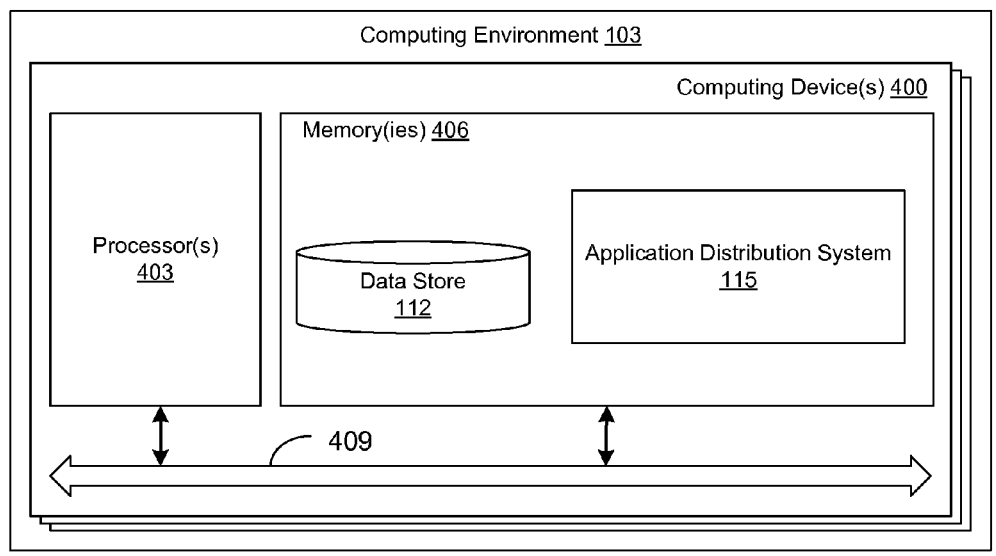
FIG. 4 is a schematic block diagram that provides one example illustration of a computing environment employed in the networked environment of FIG. 1 according to various embodiments of the present disclosure.

With reference to FIG. 4, shown is a schematic block diagram of the computing environment 103 according to an embodiment of the present disclosure. The computing environment 103 includes one or more computing devices 400. Each computing device 400 includes at least one processor circuit, for example, having a processor 403 and a memory 406, both of which are coupled to a local interface 409. To this end, each computing device 400 may comprise, for example, at least one server computer or like device. The local interface 409 may comprise, for example, a data bus with an accompanying address/control bus or other bus structure as can be appreciated.

Stored in the memory 406 are both data and several components that are executable by the processor 403. In particular, stored in the memory 406 and executable by the processor 403 are application distribution system 115, and potentially other applications. Also stored in the memory 406 may be a data store 112 and other data. In addition, an operating system may be stored in the memory 406 and executable by the processor 403.

It is understood that there may be other applications that are stored in the memory 406 and are executable by the processor 403 as can be appreciated. Where any component discussed herein is implemented in the form of software, any one of a number of programming languages may be employed such as, for example, C, C++, C#, Objective C, Java®, JavaScript®, Perl, PHP, Visual Basic®, Python®, Ruby, Flash®, or other programming languages.

A number of software components are stored in the memory 406 and are executable by the processor 403. In this respect, the term "executable" means a program file that is in a form that can ultimately be run by the processor 403. Examples of executable programs may be, for example, a compiled program that can be translated into machine code in a format that can be loaded into a random access portion of the memory 406 and run by the processor 403, source code that may be expressed in proper format such as object code that is capable of being loaded into a random access portion of the memory 406 and executed by the processor 403, or source code that may be interpreted by another executable program to generate instructions in a random access portion of the memory 406 to be executed by the processor 403, etc. An executable program may be stored in any portion or component of the memory 406 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 406 is defined herein as including both volatile and nonvolatile memory and data storage components. Volatile components are those that do not retain data values upon loss of power. Nonvolatile components are those that retain data upon a loss of power. Thus, the memory 406 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 403 may represent multiple processors 403 and/or multiple processor cores and the memory 406 may represent multiple memories 406 that operate in parallel processing circuits, respectively. In such a case, the local interface 409 may be an appropriate network that facilitates communication between any two of the multiple processors 403, between any processor 403 and any of the memories 406, or between any two of the memories 406, etc. The local interface 409 may comprise additional systems designed to coordinate this communication, including, for example, performing load balancing. The processor 403 may be of electrical or of some other available construction.

Although application distribution system 115, and other various systems described herein, may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowcharts of FIGS. 3A-3C show the functionality and operation of an implementation of portions of the application distribution system 115. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 403 in a computer system or other system. The machine code may be converted from the source code, etc. If embodied in hardware, each block may represent a circuit or a number of interconnected circuits to implement the specified logical function(s).

Although the flowcharts of FIGS. 3A-3C show a specific order of execution, it is understood that the order of execution may differ from that which is depicted. For example, the order of execution of two or more blocks may be scrambled relative to the order shown. Also, two or more blocks shown in succession in FIG. 3 may be executed concurrently or with partial concurrence. Further, in some embodiments, one or more of the blocks shown in FIG. 3 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the application distribution system 115, that comprises software or code can be embodied in any non-transitory computer-readable medium for use by or in connection with an instruction execution system such as, for example, a processor 403 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A non-transitory computer-readable medium embodying a program executable in at least one computing device, comprising:
    code that intercepts a first communication from a first component of an application executing on a server computing device to a second component of the application executing on a client computing device, wherein the first component and the second component of the application are extracted from a version of the application configured to execute on a single computing device;
    code that determines that a function requested in the first communication is provided by the second component of the application;
    code that generates a first packet based at least in part on a destination of the first communication and a payload of the first communication;
    code that sends the first packet to the client computing device;
    code that obtains a second packet from the network, wherein the second packet is received from the second component;
    code that extracts a second communication from the second packet; and
    code that sends the second communication to the first component.

2. The non-transitory computer-readable medium of claim 1, wherein at least one of the first component or the second component comprises at least one of a data structure in a library, a subroutine, a function, or an externally identified component.

3. The non-transitory computer-readable medium of claim 1, wherein the second communication comprises a call to a function of the first component.

4. A system, comprising:
    at least one computing device; and
    a first application executable in the at least one computing device, the first application comprising:
        logic that intercepts a communication from a first component of a second application to a second component of the second application, wherein the first component of the second application and the second component of the second application are extracted from a version of the second application configured to execute on a single computing device;

logic that determines that a function requested in the communication is provided by the second component of the second application;

logic that generates a packet based at least in part on a location of the second component of the second application within a network environment and the intercepted communication; and logic that forwards the packet to the second component of the second application.

5. The system of claim 4, wherein the at least one computing device comprises a first computing device and the first application further comprises logic that identifies a network address for the location of a second computing device executing the second component of the second application.

6. The system of claim 4, wherein the packet comprises a function call for a function provided by the second component.

7. The system of claim 4, wherein at least one of the first component or the second component comprises a data structure in a library.

8. The system of claim 4, wherein at least one of the first component or the second component comprises a subroutine.

9. The system of claim 4, wherein at least one of the first component or the second component comprises a function.

10. The system of claim 4, wherein at least one of the first component or the second component comprises an externally identified component.

11. The system of claim 4, wherein the communication comprises a first communication, the packet comprises a first packet, and the first application further comprises:

logic that obtains a second packet from the network environment, wherein the second packet is received from the second component of the second application;

logic that extracts a second communication from the second packet; and logic that sends the second communication to the first component of the second application.

12. The system of claim 4, wherein the packet comprises at least one value to be passed to the function provided by the second component of the second application.

13. A method, comprising:

intercepting, in a first computing device, a first communication from a first component of an application executing on the first computing device to a second component of the application executing on a second computing device, wherein the first component and the second component of the application are extracted from a version of the application configured to execute on a single computing device;

determining, in the first computing device, that a function requested in the first communication is provided by the second component of the application;

generating, in the first computing device, a first packet based at least in part on a destination of the first communication and a first payload of the first communication;

sending, via the first computing device, the first packet to the second computing device;

obtaining, in the first computing device, a second packet from a network, wherein the second packet is sent from the second component;

extracting, in the first computing device, a second payload from the second packet; and providing, in the first computing device, the second payload to first component of the application.

14. The method of claim 13, wherein the first payload comprises a message from the first component of the application to the second component of the application.

15. The method of claim 13, wherein the first payload comprises a function call from the first component of the application for a function provided by the second component of the application.

16. The method of claim 13, wherein at least one of the first component or the second component comprises a data structure in a software library.

17. The method of claim 13, wherein at least one of the first component or the second component comprises a subroutine.

18. The method of claim 13, wherein at least one of the first component or the second component comprises a function.

19. The method of claim 13, wherein at least one of the first component or the second component comprises an externally identified division of the application.

20. The method of claim 13, further comprising:

analyzing, in the first computing device, the application to identify a plurality of components; and splitting, in the first computing device, the application into the plurality of components, wherein the plurality of components comprises the first component and the second components.

* * * * *